(12) United States Patent
Alain et al.

(10) Patent No.: US 7,088,493 B2
(45) Date of Patent: Aug. 8, 2006

(54) LIGHT MODULATING MICRODEVICE

(75) Inventors: Christine Alain, Québec (CA); Francis Picard, St-Augustin-de-Desmaures (CA); Hubert Jerominek, Québec (CA)

(73) Assignee: Institut National D'Optique, Quebec (CA)

( * ) Notice: Subject to any disclaimer, the term of this patent is extended or adjusted under 35 U.S.C. 154(b) by 0 days.

(21) Appl. No.: 10/825,044

(22) Filed: Apr. 15, 2004

(65) Prior Publication Data

US 2005/0231792 A1   Oct. 20, 2005

(30) Foreign Application Priority Data

Apr. 14, 2004 (CA) .................................. 2464207

(51) Int. Cl.
*G02B 26/00* (2006.01)
(52) U.S. Cl. ..................................... 359/291; 359/290
(58) Field of Classification Search ................ 359/291, 359/290, 295, 245, 298, 849, 224
See application file for complete search history.

(56) References Cited

U.S. PATENT DOCUMENTS

| | | | |
|---|---|---|---|
| 3,886,310 A | 5/1975 | Guldberg et al. | |
| 4,317,611 A | 3/1982 | Petersen | |
| 4,615,595 A | 10/1986 | Hornbeck | |
| 4,662,746 A | 5/1987 | Hornbeck | |
| 5,061,049 A | 10/1991 | Hornbeck | |
| 5,083,857 A | 1/1992 | Hornbeck | |
| 5,096,279 A | 3/1992 | Hornbeck et al. | |
| 5,212,582 A | 5/1993 | Nelson | |
| 5,216,537 A | 6/1993 | Hornbeck | |
| 5,233,456 A | 8/1993 | Nelson | |
| 5,293,511 A | 3/1994 | Poradish et al. | |
| 5,312,513 A | 5/1994 | Florence et al. | |
| 5,331,454 A | 7/1994 | Hornbeck | |
| 5,382,961 A | 1/1995 | Gale, Jr. | |
| 5,392,151 A | 2/1995 | Nelson | |
| 5,444,566 A | 8/1995 | Gale et al. | |
| 6,025,951 A | 2/2000 | Swart et al. | |
| 6,147,789 A | 11/2000 | Gelbart | |
| 6,268,948 B1 | 7/2001 | Gelbart | |
| 2002/0135857 A1 | 9/2002 | Fitzpatrick et al. | |
| 2002/0150377 A1 | 10/2002 | Gelbart | |
| 2002/0154380 A1 | 10/2002 | Gelbart | |

*Primary Examiner*—Scott J. Sugarman
*Assistant Examiner*—Richard Hanig
(74) *Attorney, Agent, or Firm*—Wallenstein & Wagner, Ltd.

(57) ABSTRACT

A light modulator comprises a mirror, a substrate provided with at least one electrode, and at least one hinge extending between the substrate and the mirror. The mirror is flexible with the hinge being displaceable for allowing for the displacement and/or the deformation of the mirror. Typically, there are two symmetrically disposed hinges, each including upper and lower arms that define an angle therebetween. The upper arm is connected to the mirror, and the lower arm is mounted to the substrate. The upper and lower arms are adapted to pivot relative to one another thereby allowing the angle to vary and thus allowing the mirror to at least one of displace and deform. When unbiased, the mirror may be plane, convex or concave. When biased, the plane mirror adopts a curved attitude, whereas the curved mirror changes its curvature. The upper and lower arms of each hinge are V-shaped and define an apex. The apexes extend inwardly in a facing relationship.

38 Claims, 8 Drawing Sheets

LIGHT MODULATING MICRODEVICE

CROSS-REFERENCE TO RELATED APPLICATION

This Application is the U.S. filing claiming priority from Canadian Application No. 2,464,207 filed Apr. 14, 2004, now pending.

BACKGROUND OF THE INVENTION

1. Field of the Invention

The present invention relates to spatial light modulators (SLM) for amplitude and phase modulation of incident light and, more particularly, to a mirror and to a hinge mechanism for miniaturized spatial light modulators.

2. Description of the Prior Art

Microdevices for light modulation go back 20 years or more. In the majority of cases, these devices are comprised of an electrostatically actuated mirror, supported by torsion bars along the axis of rotation of the mirror. A classic example can be found in U.S. Pat. No. 4,317,611 issued on Mar. 2, 1982 to Petersen, in which an "Optical Ray Deflection Apparatus" is described.

The following United States Patents and Patent Application Publications are also known.

| U.S. Pat. No. | Issue Date | Inventor(s) |
| --- | --- | --- |
| 3,886,310 | May 27, 1975 | Guldberg et al. |
| 4,615,595 | Oct. 7, 1986 | Hornbeck |
| 4,662,746 | May 5, 1987 | Hornbeck |
| 5,061,049 | Oct. 29, 1991 | Hornbeck |
| 5,083,857 | Jan. 28, 1992 | Hornbeck |
| 5,096,279 | Mar. 17, 1992 | Hornbeck et al. |
| 5,212,582 | May 18, 1993 | Nelson |
| 5,216,537 | Jun. 1, 1993 | Hornbeck |
| 5,233,456 | Aug. 3, 1993 | Nelson |
| 5,293,511 | Mar. 8, 1994 | Poradish et al. |
| 5,312,513 | May 17, 1994 | Florence et al. |
| 5,331,454 | Jul. 19, 1994 | Hornbeck |
| 5,382,961 | Jan. 17, 1995 | Gale, Jr. |
| 5,392,151 | Feb. 21, 1995 | Nelson |
| 5,444,566 | Aug. 22, 1995 | Gale et al. |
| 6,025,951 | Feb. 15, 2000 | Swart et al. |
| 6,147,789 | Nov. 14, 2000 | Gelbart |
| 6,268,948 | Jul. 31, 2001 | Gelbart |

| U.S. Publ. No. | Publ. Date | Inventor(s) |
| --- | --- | --- |
| 2002/0135857A1 | Sep. 26, 2002 | Fitzpatrick et al. |
| 2002/0150377A1 | Oct. 17, 2002 | Gelbart |
| 2002/0154380A1 | Oct. 24, 2002 | Gelbart |

As mentioned hereinabove, microdevices for light modulation have been around for many years. In the majority of cases, these devices comprised an electrostatically actuated mirror, supported by torsion bars along the axis of rotation, as in aforementioned U.S. Pat. No. 4,317,611 to Petersen describing an "Optical Ray Deflection Apparatus".

Before proceeding with a detailed description of the present invention, it is worthwhile to briefly discuss the basic fundamentals of electrostatic light modulating devices, including an overview of SLM devices.

In FIG. 1a, schematics of the three fundamental SLM architectures and associated modulation properties are shown. To the left, a torsion mirror 10 which provides amplitude modulation is suspended by torsion hinges 12 along an axis of symmetry, e.g., an axis that extends through the middle of opposed edges of a square mirror, an axis that extends through opposed corners again of a square mirror, etc. The torsion mirror 10 can be used to steer light into, or away from, the acceptance cone of an optical imaging system. Amplitude modulation is obtained by controlling the length of time the light is directed into the acceptance cone during one image frame. The technique is referred to as pulse-width modulation. This type of SLM is typically operated in a digital mode.

In the middle of FIG. 1a, a cantilever type SLM 14 is supported by either a torsion hinge 16 or a flap-based hinge 18. This type of SLM provides both amplitude and phase modulation, and is typically operated in an analog mode.

A piston type SLM 20, shown on the right of FIG. 1a, provides strictly phase modulation of the incident light. The piston type SLM 20 is usually supported by four flap hinges 22 and the mirror moves in a direction perpendicular to its plane. This device is usually operated in analog mode.

Of these three SLM designs described hereinabove, the torsion based device is the most common, in part due to its popularization by Texas Instruments. The discussion which follows will therefore focus primarily on this type of device. Nevertheless, the underlying principles, can for the most part, be applied to the other SLM designs.

In FIGS. 1b and 1c, generic schematics of an electrostatically actuated torsion hinge device 24 are shown. FIG. 1b illustrates the basic architecture, while FIG. 1c represents a schematic vertical cross section of the device 24. In FIG. 1b, it is shown that the device architecture includes a mirror 26 suspended along an axis of rotation 28 by torsion bar hinges 30 (as discussed earlier), the axis of rotation in this particular device 24 extending symmetrically through opposed corners of the mirror 26. The torsion bars 30 are in turn suspended above an underlying substrate 32 by support posts 34. Also on the substrate 32, some distance from the axis of rotation 28, are drive electrodes 36.

The mirror 26 and drive electrodes 36 are electrically conductive, and form a parallel plate capacitor.

Applying a potential difference between the mirror 26 and one of the drive electrodes 36 loads charge onto the capacitor plates, the quantity of charge being a function of the effective capacitance and the potential difference. Because the charge on the mirror 26 and given electrode 36 are of opposite sign, an electrostatic attractive force is generated which pulls the mirror 26 towards the charged electrode 36. This, in turn, causes the mirror 26 to tilt an angle θ about its axis of rotation 28. The maximum angle of tilt, $\theta = \theta_{max}$, occurs when the mirror 26 touches the underlying substrate 32, and is governed by the maximum length of extension of the mirror 26 from its axis of rotation 28, and the height of the support posts 34. Typical values for $\theta_{max}$ range from a fraction of a degree to as much as 10°. It is common practice to define a normalized tilt angle α, viz. $\alpha = \theta/\theta_{max}$.

A number of modes of operation for such a torsion hinge device 24 are possible, and they include bistable, tristable, and analog. In bistable mode (binary mode), the mirror 26 is operated in only two states, namely α±1. Here, a sufficiently high potential is applied to a given address electrode 36 so that the mirror 26 turns until it rests on the underlying substrate 32. This is a useful mode of operation when the application requires binary amplitude modulation of an incident light beam. In the second mode of operation, the mirror 26 has three states, α=0°, α±1. While this mode of operation is in principle possible, it is not often used because the α=0° position is usually imprecise; because of mechanical and material considerations, it is not guaranteed that the torsion hinges 30 will restore the mirror 26 to precisely the α=0° position. In the third mode of operation, a variable voltage is applied to the address electrodes 36, causing the mirror 26 to tilt in an analog fashion. The theory behind these three operational modes is rather involved, and is elaborated in more detail in several of the patents cited herein.

Cantilever and piston type devices are generally operated only in analog mode. The operation is similar to that described above for analog operation of the torsion type device 24. Note that in the cantilever and piston type devices there is typically only one address electrode.

Certain requirements must be met in order for a SLM device to be useful. For one, the torque required to twist the torsion bars (restoring torque) must not exceed the torque that can be generated electrostatically using a "reasonable" potential difference. The acceptable maximum potential difference is typically governed by the type of control circuitry used, although other factors can prevail as well.

The mirror shown in FIG. 1a must be rigid enough that it does not bend significantly when actuated. Bending occurs because the force that causes the mirror to move is not matched by an equal and opposite force on the other side of the axis of rotation. The acceptable level of bending is dictated primarily by the light wavelength(s) for which the device is intended to operate, and the optical configuration in which it is incorporated.

The mirror must be spaced sufficiently high enough above the underlying substrate so that an adequate angle of tilt is provided for the given application. Since large vertical distances are difficult to obtain using thin film processing technologies, tilt angles are generally limited to small values. Assuming a flat mirror and substrate, then $\theta_{max} = \text{Tan}^{-1}$ (h/l) where h is the height of the supports, and l is the length of extent of the mirror taken perpendicular to the axis of rotation.

Finally, a high fill factor is important, particularly when SLM's are arranged in arrays. Therefore, the area required for the support mechanism must be small relative to the mirror area. Because of processing considerations, high fill factors become more difficult to obtain as mirror size is reduced.

Similar requirements exist for the cantilever and piston type devices.

One of the first examples of such a SLM device, or more precisely, a μ(micro)-SLM device is found in U.S. Pat. No. 3,886,310 to Guldberg et al., which was issued in 1975. A brief discussion of the invention thereof is worthwhile as it illustrates some of the underlying concepts of μ-SLM's. The device is used to project images by diffraction, using a complex optical system, which includes the usual Schlieran stop (or equivalent) found in most diffraction based projection systems. Electrostatic actuation is achieved by charging the planar reflective portion of the structure with an electron beam (the mirror array is mounted inside an electron picture tube). This device is intended primarily for projection in the visible part of the spectrum. The hinge mechanism is a type of flap connected to one corner of the mirror, which bends when the mirror is tilted. The mirrors are arranged in a cloverleaf fashion, with four hinged mirrors (wings) supported by a central post.

Petersen's aforementioned U.S. Pat. No. 4,317,611 is directed to a device that represents a key milestone in the development of miniaturized SLM's. It is constructed in a hybrid fashion, with the lower portion containing the address electrodes, and the upper portion containing the mirror. These two portions are glued together. It is noted that this construction makes mass production of the device rather difficult.

Electrostatic actuation is achieved by applying a positive bias to one of the address electrodes with respect to the mirror, causing the mirror to tilt about it. It is worth noting that Petersen states that the actuation voltage is in the order of 300 volts, significantly higher than what can be obtained with standard IC semiconductor circuitry. The supporting "land" prevents the mirror from collapsing on the substrate when actuated due to the long torsion hinges. The intended application for this device is primarily in optical scanning systems, in which the mirror is operated at, or near, a mechanical resonance.

Subsequent to the Petersen Patent, an extensive collection of developments were made in the art of SLM's by Texas Instruments (TI) Inc., a recognized leader in the μ-SLM field. Texas Instruments has made extensive developments over the years to their μ-SLM technology. Note that TI uses the acronym DMD when referring to their technology, which originally stood for "Deformable Micromirror Device". TI has since changed the meaning of the acronym to "Digital Micromirror Device".

Texas Instruments have geared their DMD technology towards two key applications: high-resolution projection displays, and high-resolution colour printing systems. The requirements associated with these applications have therefore had a significant influence on TI's DMD architecture. The mirrors are small (16 μm by 16 μm) and tightly spaced (17 μm pitch), so that large density arrays can be fabricated in a manageable area of silicon. For example, a 1000 by 1000 pixel array occupies only 2.9 cm$^2$ of silicon. The mirrors also switch very quickly (≈5 μs), a necessary requirement because a pulse width modulation scheme is used to achieve grey scale imaging; the faster the mirror switching time, the larger the number of intensity levels that can be produced. The DMD arrays are manufactured on top of a standard 5V CMOS circuitry and therefore have low switching voltages. The 5V CMOS technology is mandated by the extremely high mirror density requirements.

The first TI patent in this area, U.S. Pat. No. 4,615,595, is entitled "Frame Addressed Spatial Light Modulator" and issued in 1986. This Patent describes a cloverleaf mirror design, fabricated on a CCD CMOS circuit.

The underlying CCD is used to pump electrical charge onto the cloverleaf, causing all four mirrors to deflect downward to the ground plane. While the method of charging the mirror is novel, this device is very similar in concept to that described in U.S. Pat. No. 3,886,310 mentioned previously. In particular, the cloverleaf and hinge mechanism is for all intents and purposes the same as that described by Guldberg and Nathanson.

The architecture and control circuit approach disclosed in U.S. Pat. No. 4,615,595 has since been replaced by another design which will be addressed hereinafter. One reason was undoubtedly due to the poor contrast of projection systems employing the device, since its operation requires a Schlieran configuration (or equivalent). In U.S. Pat. No. 5,061,049 awarded to Hornbeck in 1991, the mirror is supported by torsion hinges that twist when the mirror rotates. In this regard, the design is similar to that of Petersen (U.S. Pat. No. 4,317,611), although here the manufacturing process is monolithic. Also, this mirror design does not require a Schlieran projector for imaging, and can therefore be used to produce high-brightness, high-contrast images.

The torsion hinges must clearly be made thinner than the mirror in order for the device to rotate without warping. The hinges are supported above the substrate by a spacer layer (or equivalent, such as metal support posts). Electrostatic actuation is achieved using the addressing electrodes. In order that the mirror can be turned with small voltages, these hinges must be extremely thin, ~700 angstroms, and fairly long, i.e. more than 8 μm. While the torsion hinge design is suitable for small mirrors, it does not work well for large mirrors; larger structures will tend to sag in the middle if support is provided only at their edges. In addition, because the hinges must be thin, and long, they generally exhibit a low thermal conductance. This reduces the mirrors capability to adequately dissipate heat, which can result in irreversible damage should it be employed for modulation of high energy beams.

Using the fabrication process described in this same U.S. Pat. No. 5,061,049, a variety of hinge configurations are possible. For example, the mirror can be hinged at one corner, or along one edge. It must be noted that when the mirror is hinged at a corner, the hinge is of the bending type, rather than the torsion type.

U.S. Pat. No. 5,083,857 issued to Hornbeck in 1992 describes a novel two level mirror structure in which the torsion hinges are placed in a layer beneath the mirror layer. This two-layer structure was required to improve of the low fill factor of TI's first generation mirror design. As was mentioned earlier, torsion hinges need to be fairly long for sufficient flexibility thereby limiting the packing density of mirrors supported by such hinges. For the small mirrors, the fill factor is inadequate using a one-level architecture. By placing the hinge mechanism directly beneath the mirror, and connecting this mechanism to the mirror by a yoke, the fill factor is improved significantly.

The actuation mechanisms described in the earlier TI Patents still apply to this hidden hinge architecture and a number of hinge configurations are possible. One key drawback of this architecture is the complex fabrication process required and this manufacturing process is set forth in the Patent. Despite this drawback, the small mirror size and high fill factors required for high-resolution projection displays has forced TI to employ this method of fabrication in their commercial DMD arrays.

U.S. Pat. No. 5,233,456 issued to Nelson discloses a method to extend the basic DMD architecture to larger mirror sizes. According to this patent, a larger mirror can be supported by a plurality of torsion hinges included along the axis of rotation. These torsion hinges, and the method of fabrication, are identical to the standard DMD design. The Patent covers a resonant mirror fabricated using this approach.

U.S. Pat. No. 5,212,582, also issued to Nelson, is virtually identical in content to U.S. Pat. No. 5,233,456, except that it describes how the hidden hinge architecture can be used for fabricating large mirrors.

U.S. Pat. No. 5,312,513 issued to Florence et al. discloses a method of forming phase light modulators using the basic DMD hidden hinge architecture. These phase light modulators are of the piston type. A particularly unique feature of this invention is that the phase modulation is achieved using binary addressing circuitry, i.e., the pistons are operated in digital mode. Phase modulation is achieved by resolving light from two or more sub-elements, each designed to have different zero-offset phase differences.

In U.S. Pat. No. 6,025,951 issued on Feb. 15, 2000 to Swart et al., there is disclosed a light modulator for at least one of amplitude and phase modulation of incident light, which includes a mirror, a substrate provided with electrodes, and a hinge extending between the substrate and the mirror. The hinge is displaceable between deformed and extended positions for allowing for the displacement of the mirror. More particularly, the hinge that is provided between the SLM's substrate and the micromirror is a "flexure" hinge that comprises integral hinged sections which allow for the micromirror to tilt or to move in a piston-like fashion relative to the substrate in response to an electrostatic force. The hinge is particularly suited for supporting relatively large (>50 μm) micromirrors prone to sagging in the middle if their support is provided only at their edges, such as by conventional torsion hinges. In addition, the hinge can provide improved heat sinking capability over previously reported SLM hinge designs based on torsion bars and cantilever beams. The flexure hinge has sufficient mechanical flexibility that the SLM actuation voltage required is not excessively high. The flexure hinge has many applications, the preferred ones being a SLM for modulating high-energy beams and a SLM for optical channel switching.

FIGS. 2a to 5 and 5 to 7 illustrate respectively first and second micro-SLMs of this U.S. Pat. No. 6,025,951, which includes integrated flexure hinges.

More particularly, FIGS. 2a, 2b, 3a, 3b and 3c illustrate a micro-SLM M having a first integrated flexure hinge 40 with FIG. 2b showing the hinge 40 in an enlarged state. The hinge 40 is integrated with a mirror 42 and will be referred to as the flexure hinge 40 based on its behavioral properties and characteristics, i.e., in view of how it operates. An opening 98 is defined in the mirror 42 around the hinge 40, as seen in FIGS. 2a and 2b. Although only flexure hinge 40 is shown for supporting the mirror 42, a plurality of flexure hinges 40 can be used to support a single mirror, particularly if the mirror is large.

The flexure hinge 40 is electrically conductive so that the mirror 42 can be electrostatically actuated. The flexure hinge 40 does not have a fixed axis of rotation, as in the case of torsion hinges, for example. Nevertheless, the axis of rotation moves only slightly when the mirror 42 is actuated. An approximate position of the axis of rotation 44 of the mirror 42 is shown in FIG. 2a for illustration purposes.

In FIGS. 3a, 3b and 3c, various two-dimensional vertical cross sections of the SLM M with its electrostatically actuated mirror 42 incorporating the flexure hinge 40 are shown. More particularly, FIG. 3a shows the mirror 42 in an unbiased state, with FIG. 3b showing the mirror 42 being operated in amplitude modulation mode, whereas FIG. 3c shows the mirror being operated in phase modulation mode. The flexure hinge 40 is located on top of a substrate 46 and two address electrodes 48 and 50 are deposited on the substrate 46.

With reference to FIG. 3b, when a potential is applied between the mirror 42 and one of the address electrodes 48 and 50, in this case the electrode 48 as seen in FIG. 3b, an electrostatic force 52 causes the mirror 42 to tilt. This represents the amplitude mode of operation. A sufficiently high potential will cause the mirror 42 to tilt until it touches the substrate 46. Releasing the potential causes the mirror 42 to return to approximately the horizontal position due to restoring torque of the hinge 40.

Now referring to FIG. 3c, if equal potentials are simultaneously applied to both electrodes 48 and 50 with respect to the mirror 42, an electrostatic force 54 causes the mirror 42 to be pulled down towards the substrate 46 while substantially remaining in a horizontal position. This is the phase modulation mode of operation.

With reference to FIG. 4, the flexure hinge 40 comprises a lower horizontal web 56 sitting atop the substrate 46 and a pair of integral side arms 58 of composite configuration which extend upwardly and symmetrically from opposite edges of the web 56. Each side arm 58 includes a lower angled section 60, an intermediate substantially horizontal section 62, an upper angled section 64, and a mirror-supporting flange 80 at the upper end of the angled section 64.

The geometrical parameters which characterize the flexure hinge 40 are shown in FIG. 4 and include the thickness t of the material forming the flexure hinge 40, the length w of the web 56, the respective lengths l1, l2 and l3 of the lower angled section 60, of the horizontal section 62 and of the upper angled section 64, respectively, and a hinge width d. Furthermore, the web 56 and the lower angled section 60 define therebetween an angle $\theta_1$, with the lower angled section 60 and the horizontal section 62 defining therebetween an angle $\theta_2$, whereas the horizontal section 62 and the upper angled section 64 define therebetween an angle $\theta_3$. The restoring torque of the flexure hinge 40 is a complex function of all of these parameters. Moreover, it also depends on the mechanical properties of the hinge construction material. It must be noted that the flexure hinge 40 material does not necessarily have to be of the same thickness, or of the same type, as that of the mirror 42.

The flexure hinge 40 can be designed so that it is rigid enough to support the weight of a mirror without sagging, while at the same time being flexible enough that actuation voltages are manageable. It is reminded that a mirror, such as the mirror 42, supported with this type of flexure hinge 40 can be operated in either phase or amplitude modulation mode.

Now referring to FIGS. 5 to 7, there is shown a second flexure hinge 70 of U.S. Pat. No. 6,025,951, which is similar to the first flexure hinge 40 in how it behaves (see FIGS. 6b and 6c showing the hinge 70 subjected to electrostatic forces in amplitude modulation mode and in phase modulation mode, respectively). As with the first flexure hinge 40, the second flexure hinge 70 is electrically conductive so that the supported mirror 42 can be electrostatically actuated. The mirror 42 and its hinge 70 are sitting atop the substrate 46 and form a second SLM M'. Operation of a mirror supported by this hinge 70 is the same as that in the first hinge 40, as illustrated in FIGS. 6a, 6b and 6c which show the micro-SLM M' respectively in an unbiased state, in amplitude modulation mode, and in phase modulation mode. Therefore, as before, the mirror 42 can be operated in either amplitude or phase modulation mode.

As for the first hinge 40, the flexure hinge 70 of FIG. 7 comprises a lower horizontal web 72 sitting atop the substrate 46 and a pair of integral side arms 74 of composite configuration which extend upwardly and symmetrically from opposite edges of the web 72. Each side arm 74 includes a lower angled section 76, an upper angled section 78 and a mirror-supporting flange 80 at the upper end of the upper angled section 78.

The geometrical parameters which characterize the flexure hinge 70 are shown in FIG. 7 and include the thickness t of the material forming the flexure hinge 70, the length w of the web 72, the respective lengths l1 and l2 of the lower angled section 76 and of the upper angled section 78, respectively, and a hinge width d. Furthermore, the web 72 and the lower angled section 76 define therebetween an angle $\theta_1$, whereas the lower angled section 76 and the upper angled section 78 define therebetween an angle $\theta_2$. The restoring torque of the flexure hinge 70 is a complex function of all of these parameters. It also depends on mechanical properties of the hinge construction material.

It is easily understood that both flexure hinges 40 and 70 of U.S. Pat. No. 6,025,951 include a pair of symmetrical composite side arms which are adapted to fold under the mirror 42 either symmetrically and identically under phase modulation mode (where the mirror 42 is drawn translationally towards the substrate 46 while remaining substantially horizontal), or individually under amplitude modulation mode (where one side arm is retracted or folded while the other is deployed).

SUMMARY OF THE INVENTION

It is therefore an aim of the present invention to provide a novel mirror for micro mirror-based spatial light modulators used for at least one of amplitude and phase modulations of incident light.

It is also an aim of the present invention to provide a flexible mirror for miniaturized micro mirror-based spatial light modulators.

Therefore, in accordance with the present invention, there is provided a mirror for light modulators, comprising a light-receiving member, at least one hinge adapted to be provided at an upper end thereof with said light-receiving member, said light-receiving member being flexible, said hinge being adapted to extend below said light-receiving member and being displaceable between deformed and extended positions thereby allowing for at least one of the displacement and the deformation of said light-receiving member.

Also in accordance with the present invention, there is provided a light modulator comprising a mirror, a substrate provided with at least one electrode, and at least one hinge extending between said substrate and said mirror, said mirror being flexible with said hinge being displaceable for allowing for at least one of the displacement and the deformation of said mirror.

Further in accordance with the present invention, there is provided a hinge assembly for supporting a flexible mirror in a light modulator, comprising at least one hinge including first and second arms hingedly connected together, an upper end of said hinge being adapted to be connected to the mirror, said first and second arms of said hinge being V-shaped and defining an apex, said hinge being adapted to extend substantially under the mirror with said apex extending inwardly, said hinge being displaceable between deformed and extended positions thereof, thereby allowing for the displacement and deformation of the mirror.

Still further in accordance with the present invention, there is provided a light modulator comprising a flexible mirror, a substrate provided with at least one electrode and at least one hinge connecting said substrate and said mirror, said hinge including first and second arms hingedly connected together, an upper end of said hinge being connected to said mirror, said first and second arms of said hinge being V-shaped and defining an apex, said hinge extending substantially under the mirror with said apex extending inwardly, said hinge being displaceable for allowing for the displacement and deformation of said mirror.

BRIEF DESCRIPTION OF THE DRAWINGS

Having thus generally described the nature of the invention, reference will now be made to the accompanying drawings, showing by way of illustration a preferred embodiment thereof, and in which:

FIG. 4 is a perspective view of the flexure hinge of FIG. 2a;

DESCRIPTION OF THE PREFERRED EMBODIMENTS

Figure 1A:
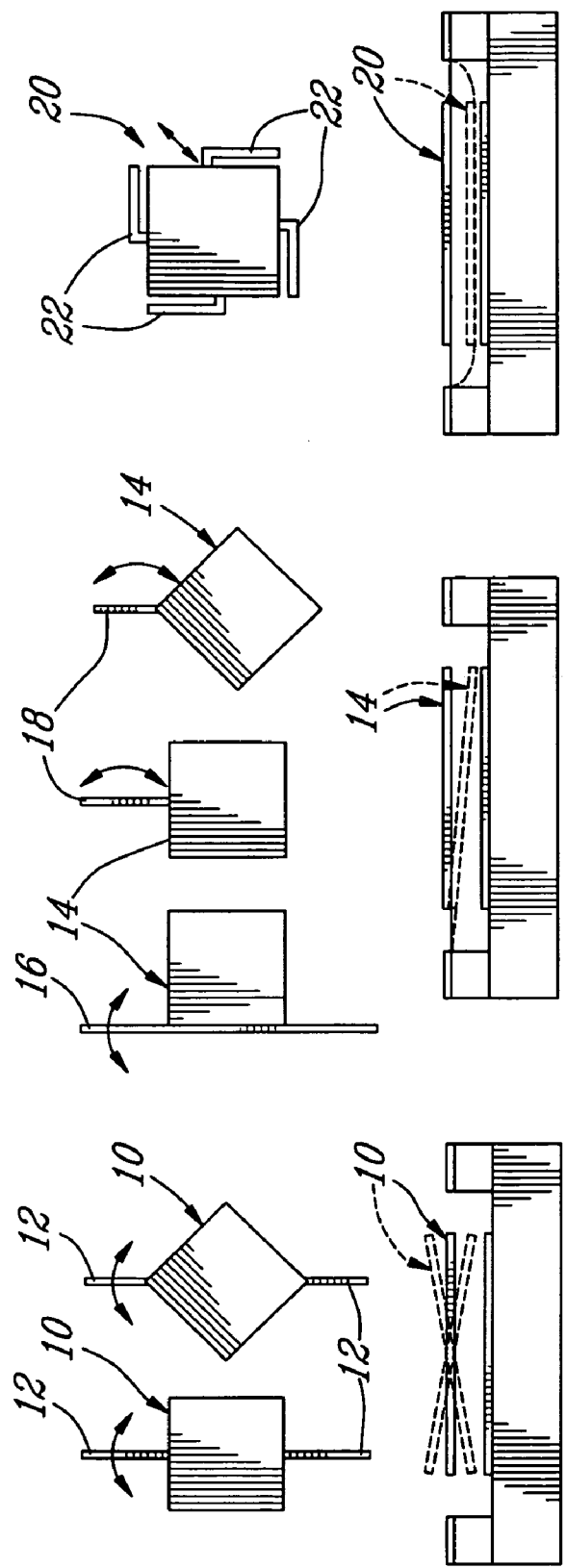
FIG. 1a schematically illustrates three conventional and fundamental SLM architectures and their associated modulation properties.
Figure 1B:
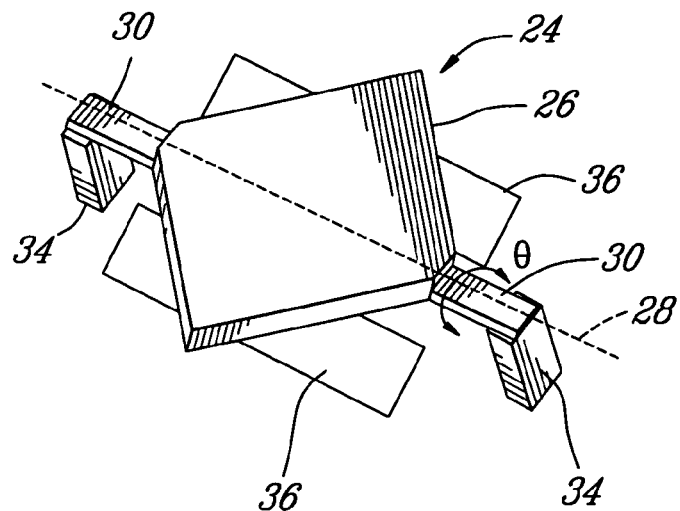
FIG. 1b is a schematic perspective view of a conventional electrostatically actuated micromirror equipped with torsion hinges.
Figure 1C:
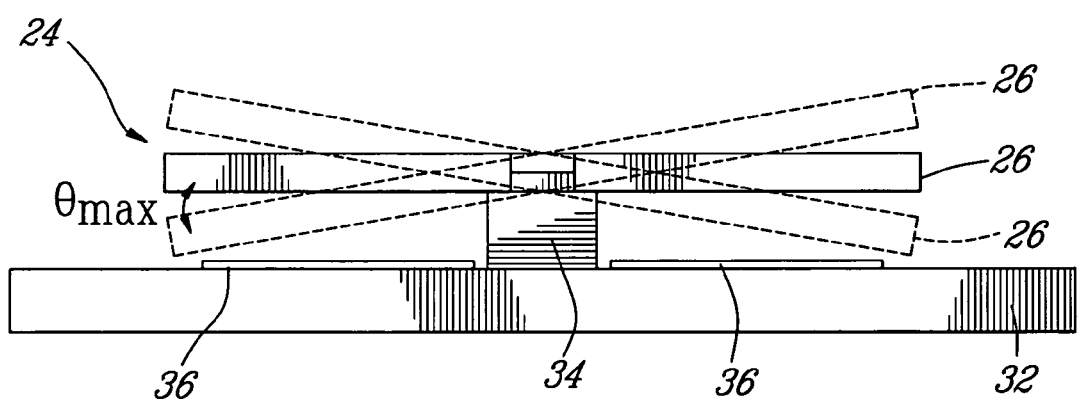
FIG. 1c is an end elevation view of the micromirror of FIG. 1b, which also shows various positions of the mirror.
Figure 2A:
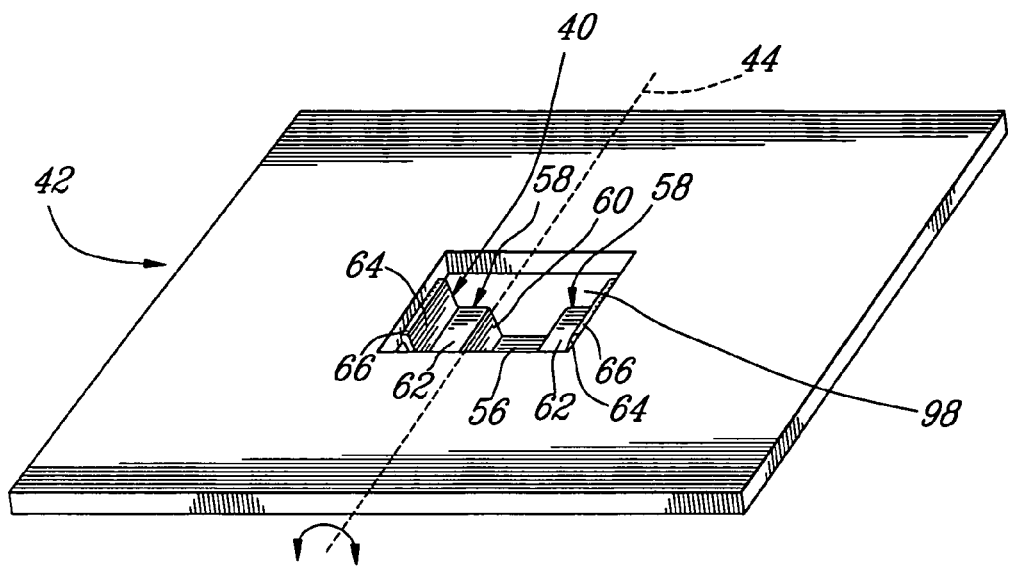
FIG. 2a is schematic perspective view of a prior art micro-SLM having a first integrated flexure hinge.
Figure 2B:
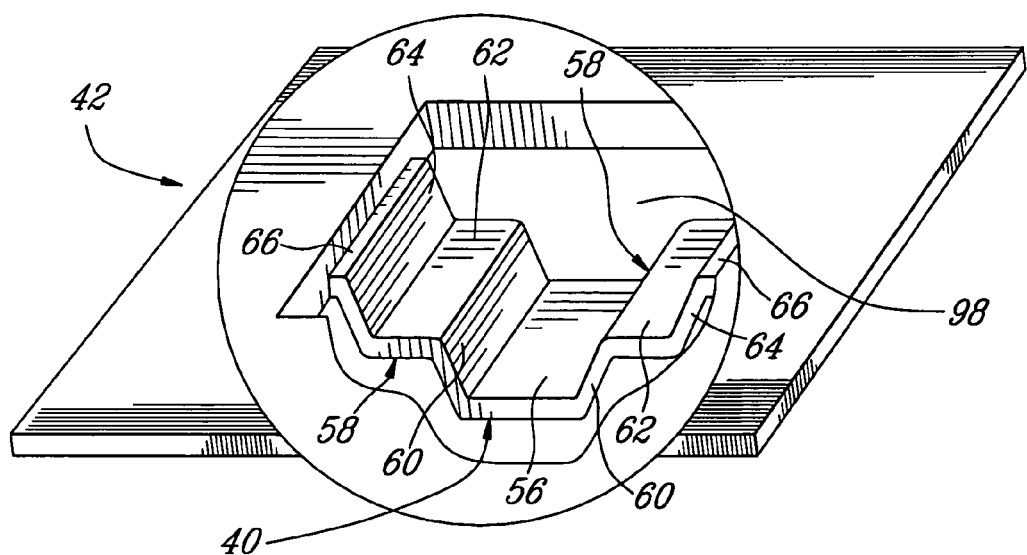
FIG. 2b is a perspective view similar to FIG. 2a but wherein the hinge is shown enlarged.
Figure 3A:
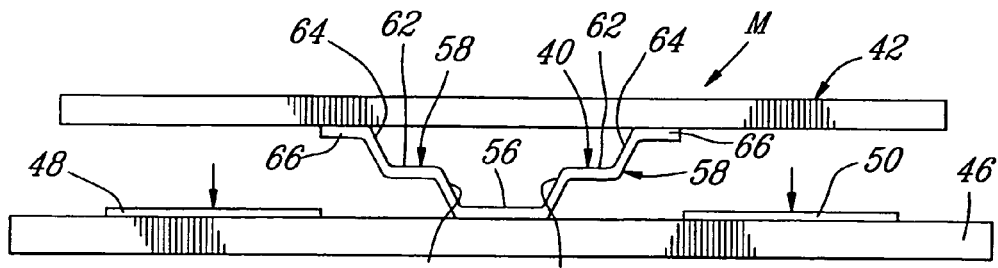
FIG. 3a is a schematic elevation view of the prior art micro-SLM of FIG. 2a shown in an unbiased state.
Figure 3B:
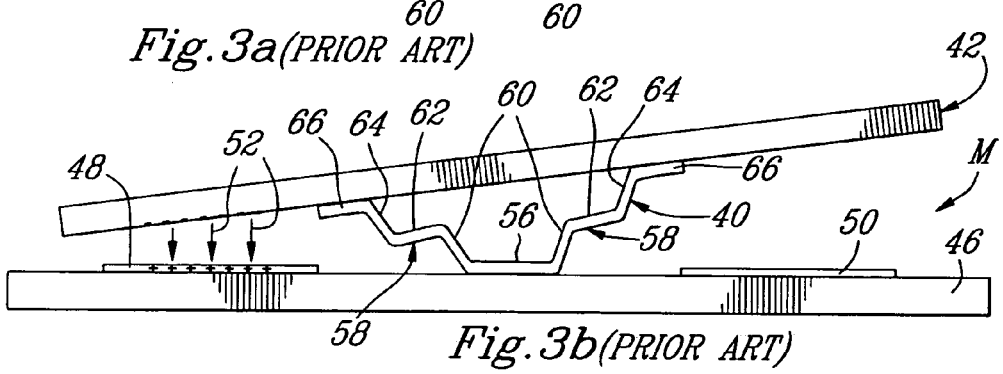
FIG. 3b is a schematic elevation view similar to FIG. 3a but showing the mirror being operated in amplitude modulation mode.
Figure 3C:
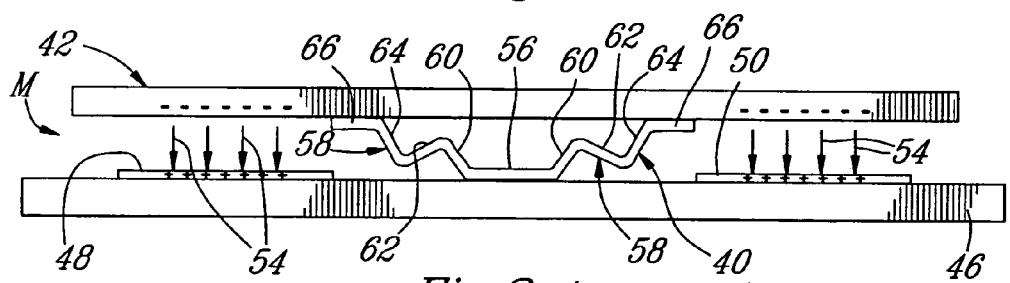
FIG. 3c is a schematic elevation view similar to FIG. 3a but showing the mirror being operated in phase modulation mode.
Figure 4:
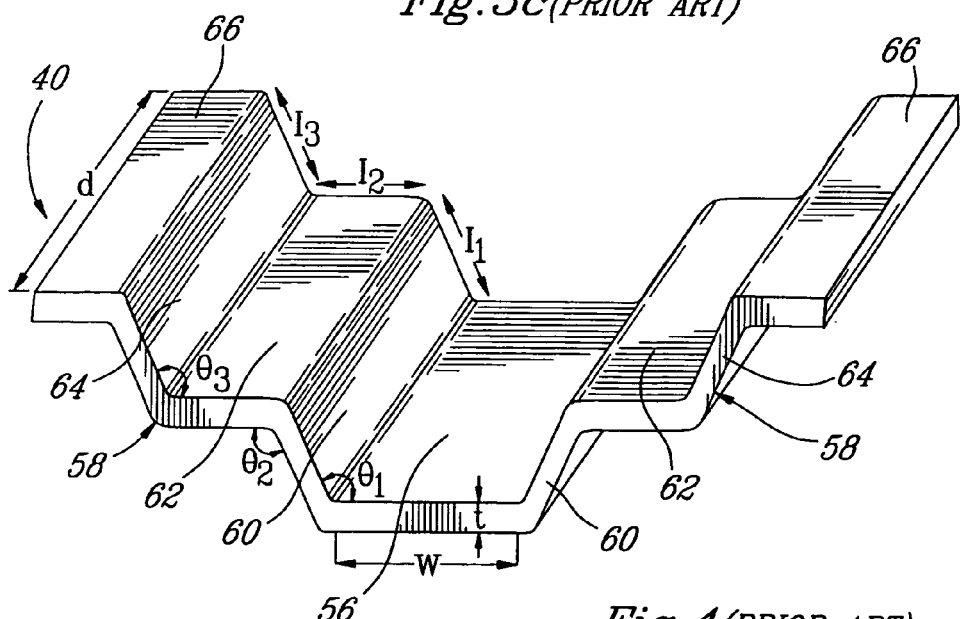
Figure 5:
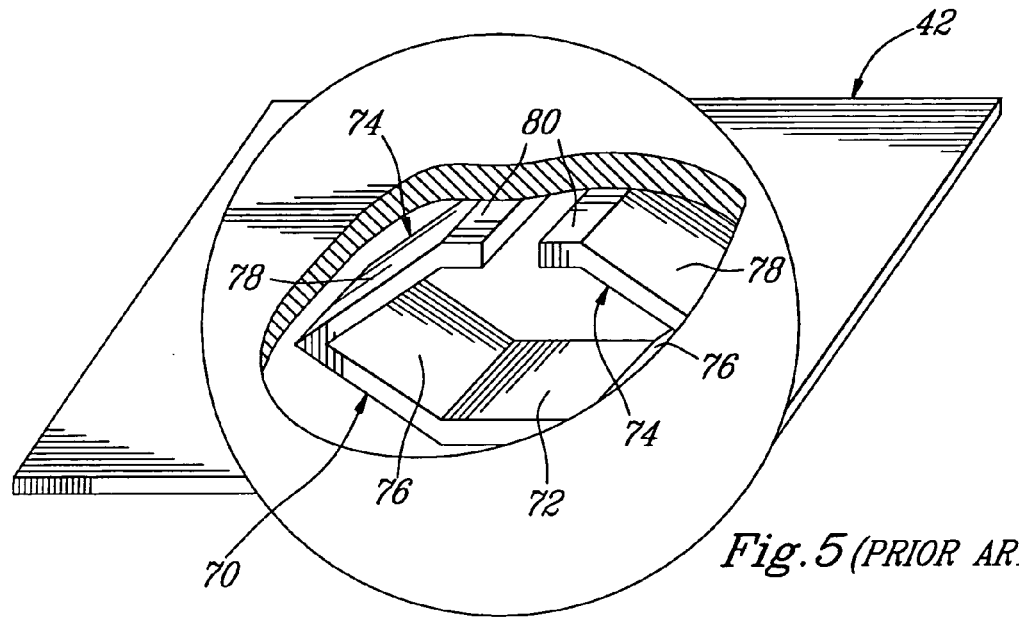
FIG. 5 is schematic perspective view of a prior art micro-SLM having a second integrated flexure hinge, wherein the hinge is shown enlarged.
Figure 6A:
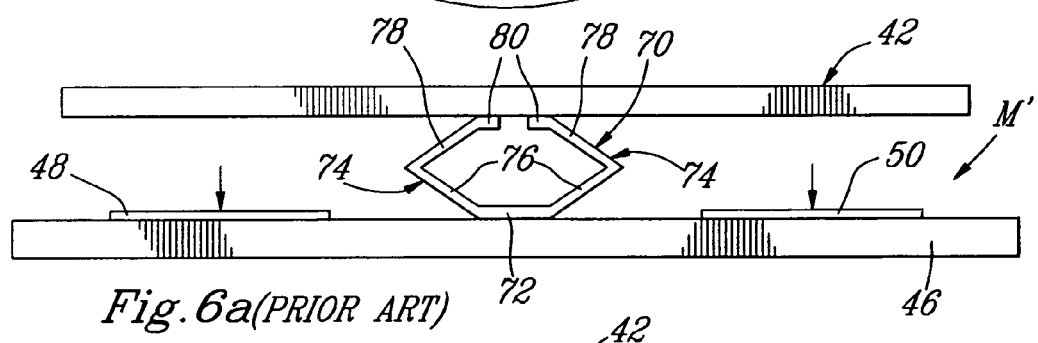
FIG. 6a is a schematic elevation view of the prior art micro-SLM of FIG. 5 shown in an unbiased state.
Figure 6B:
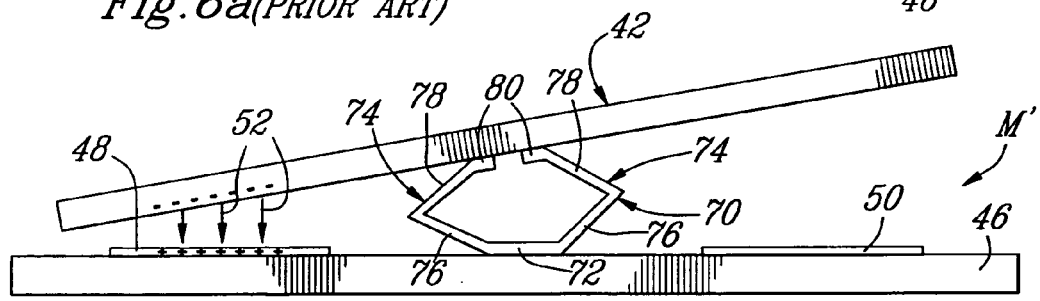
FIG. 6b is a schematic elevation view similar to FIG. 6a but showing the mirror being operated in amplitude modulation mode.
Figure 6C:
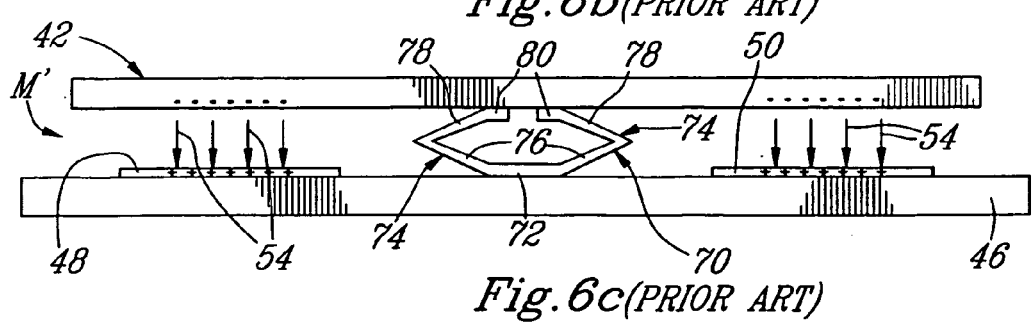
FIG. 6c is a schematic elevation view similar to FIG. 6a but showing the mirror being operated in phase modulation mode.
Figure 7:
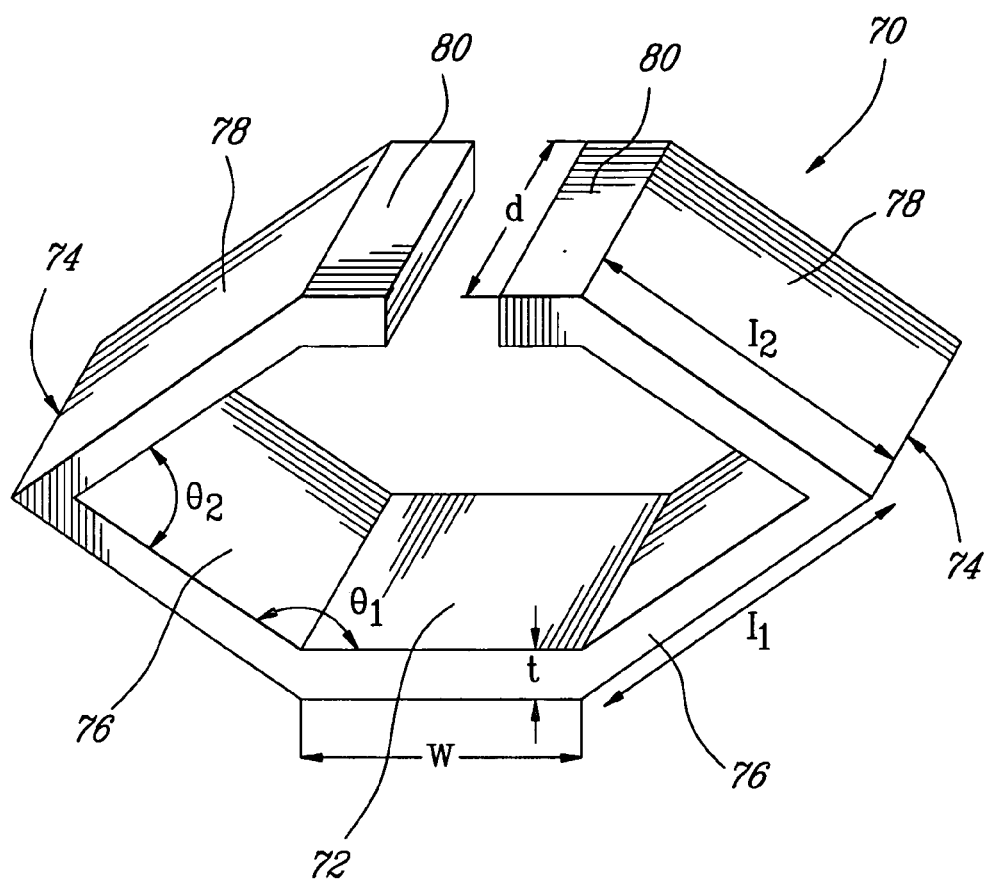
FIG. 7 is a perspective view of the flexure hinge of the FIG. 5.
Figure 8:
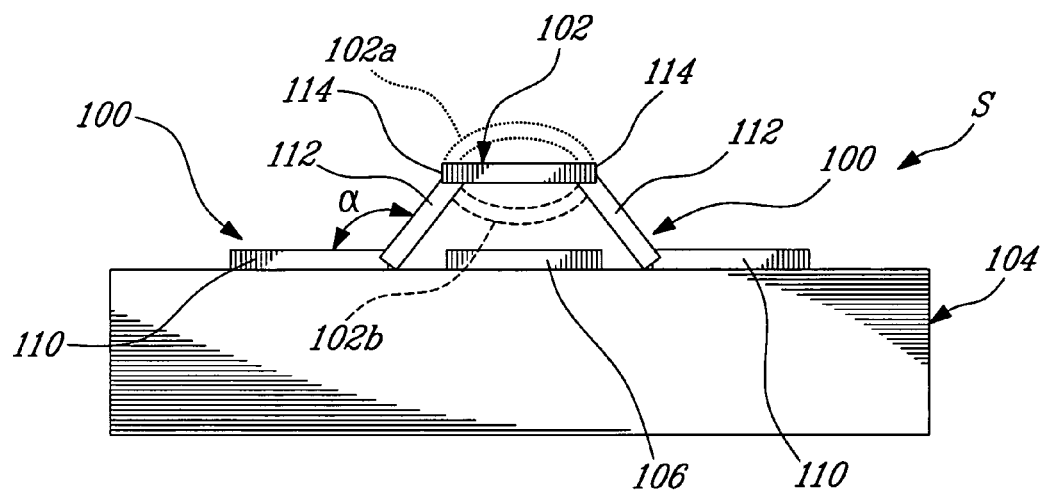
FIG. 8 is a schematic elevation view of a SLM having a flexible mirror in accordance with the present invention, the mirror being shown in an unbiased state, the phantom lines illustrating other mirror shapes also prior to activation.

In accordance with the present invention, FIG. 8 illustrates a micro-SLM S in accordance with a first embodiment of the present invention. The micro-SLM S comprises a pair of hinges 100, a flexible mirror 102, a substrate 104 and an electrode 106 deposited on the substrate 104. The hinges 100 are integrated with the mirror 102. The mirror 102 is connected to the substrate 104 via the hinges 100 such that the mirror 102 is spaced from the substrate 104, as seen in FIG. 8.

In the drawings, there are shown two such hinges 100 for supporting the mirror 102. However, it is readily understood that a plurality of hinges 100 can be used to support a single mirror, particularly if the mirror is large. It is also possible to have a single hinge. The hinges 100 and the mirror 102 are electrically conductive so that the mirror 102 can be electrostatically actuated.

The mirror 102 may, when unbiased (i.e. when the hinges 100 are in their undeformed or at-rest position thereof), be plane as shown in full lines in FIG. 8. Alternatively, the mirror 102, in its at-rest state, may be convex or concave, as seen in phantom lines respectively at 102a and 102b in FIG. 8.

Still in FIG. 8, each hinge 100 includes a lower horizontal arm 110 sitting atop the substrate 104, and an upper arm 112 that extends upwardly at an angle towards a peripheral edge 114 of the mirror 102. The mirror 102 is in fact mounted at the peripheral edge 114 thereof to an upper end of the upper arm 112 of the hinge 100. For each hinge 100, an obtuse angle α is herein defined between the hinge's lower arm 110 and upper arm 112.

The two hinges 100 are symmetrically positioned on the substrate 104 on opposite sides of the mirror 102 so as to be connected thereto on opposite portions of the peripheral edge 114 of the mirror 102. The electrode 106 is positioned between the lower arms 110 of the two hinges 100.

Figure 9:
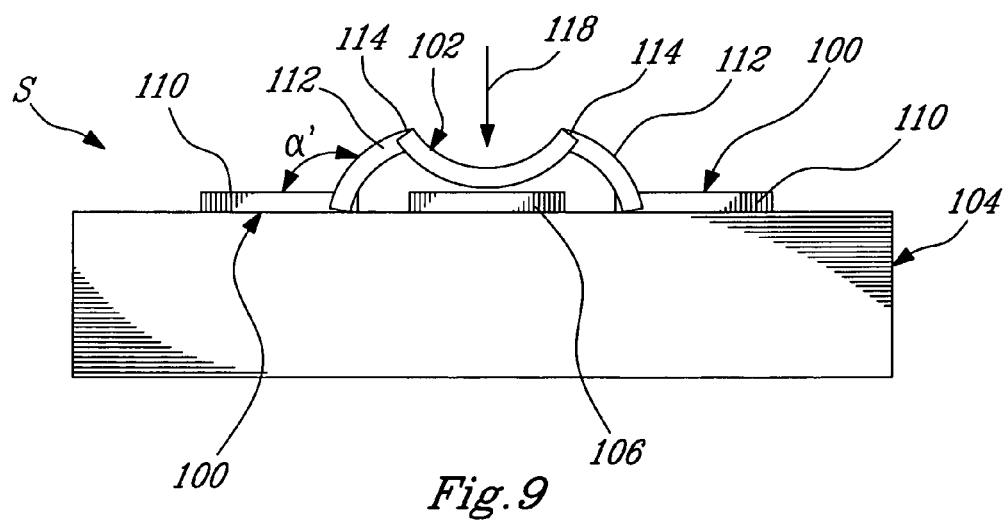
FIG. 9 is a schematic elevation view of the SLM of FIG. 8 showing the flexible mirror in a biased state.

In FIG. 9, as a potential has been applied between the mirror 102 and the address electrode 106, an electrostatic force causes the mirror 102 to be pulled down along arrow 118 towards the substrate 104. In view of the configuration and position of the hinges 100 and of the flexibility of the mirror 102, this downward movement of the mirror 102 results in the mirror 102 changing form. More particularly, the flexible mirror 102 has adopted in FIG. 9 a concave shape. The angle between the lower arm 110 and the upper arm 112 of each hinge 100 has increased to α', as the upper arms 112 of the two hinges 100 have pivoted and deformed slightly downwardly towards the electrode 106.

Releasing the potential results in the mirror 102 returning to its position of FIG. 8 due to restoring forces in the hinges 100 and the mirror 102.

One should notice the complex combined movements and deformation of the mirror 102 and the hinges 100, when the potential is applied to the mirror 102. The mirror 102 is displaced towards the address electrode 106 and deformed, i.e., there is a change in the curvature of the mirror 102. At the same time, the upper arms 112 of the hinges 100 pivot and deform downwardly towards the electrode 106 and the angle between the upper arms 112 and the lower arms 110 of the hinges 100 increases in consequence. The exact magnitude of these combined movements and deformation depends on the dimensions of the micro-SLM, mechanical and electrical properties of the materials used for construction of the mirror 102 and of the hinges 100, and the magnitude of the applied electrostatic potential. Thus, controlling the above parameters, one can precisely predict, control and exploit the micro-SLM's of the present invention.

Each hinge 100 is positioned under the mirror 102 such as to protrude downward from the mirror 102, while not necessarily being hidden underneath the mirror 102. Furthermore, the hinges 100 may each have more than the two sections thereof embodied by the lower arm 110 and the upper arm 112 in FIGS. 8 and 9. The position of these two or more sections of each hinge 100 with respect to the substrate 104 may vary, as shown in FIGS. 10a and 10b.

Figure 10A:
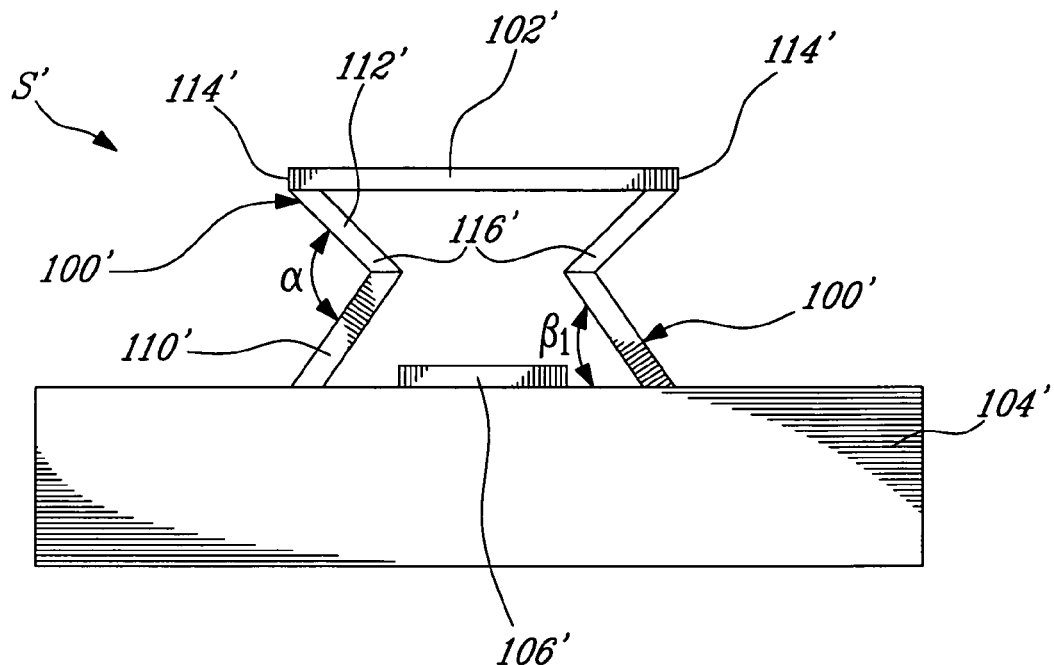
FIG. 10a is a schematic elevation view of a SLM having a novel hinge also in accordance with the present invention, the hinge being shown in an unbiased state; and, FIG. 10b is a schematic elevation view of the SLM of FIG. 10a, but shown in a biased state.
Figure 10B:
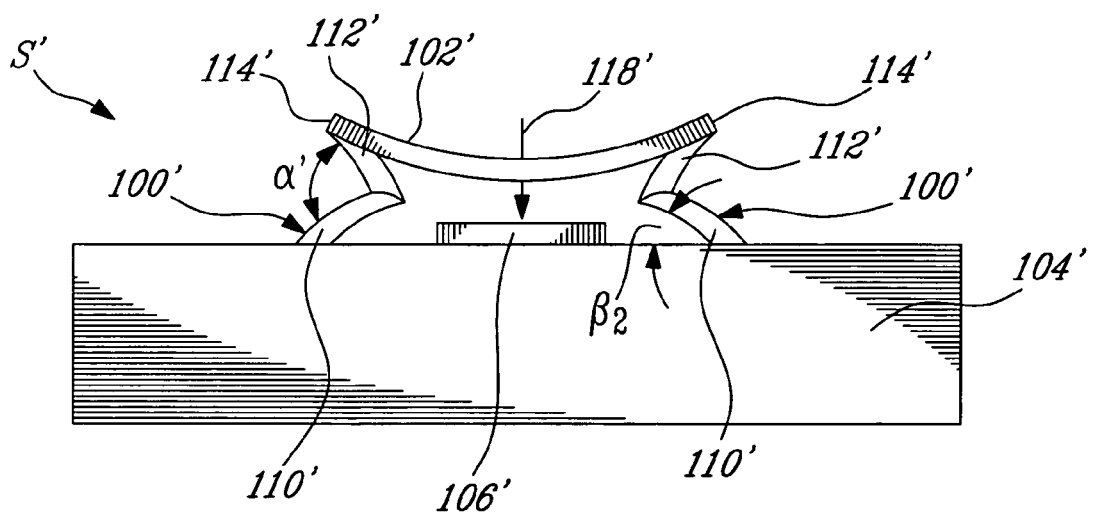

In FIGS. 10a and 10b, a variant SLM S', also in accordance with the present invention, comprises a pair of hinges 100', a mirror 102', a substrate 104' and an electrode 106' deposited on the substrate 104'. The hinges 100' are integrated with the mirror 102'. The mirror 102' is connected to the substrate 104' via the hinges 100' such that the mirror 102' is spaced from the substrate 104', as seen in FIG. 10a.

Each hinge 100' extends between the substrate 104' and the mirror 102' and, more particularly, includes lower and upper arms 110' and 112', respectively. The lower arm 110' is pivotally connected at a lower end thereof to the substrate 104'. An upper end of the lower arm 110' is pivotally connected to a lower end of the upper arm 112', i.e. at pivot 116'. An upper end of the upper arm 112' is pivotally connected to a peripheral edge 114' of the mirror 102'. Each hinge 100' forms an elbow that is directed inwardly, with an angle α being herein defined between the hinge's upper and lower arms 112' and 110', respectively. The lower arm 110' defines an angle $\beta_1$ with respect to the substrate 104'.

The two hinges 100' are symmetrically positioned under the mirror 102' and are connected to the mirror 102' at opposite portions of the peripheral edge 114' of the mirror 102'. The electrode 106' is positioned between the lower arms 110' of the two hinges 100'.

In FIG. 10*b*, a potential has been applied between the mirror 102' and the address electrode 106', such that an electrostatic force has caused the mirror 102' to be pulled down along arrow 118' towards the substrate 104'. In view of the configuration and position of the hinges 100', this downward movement of the mirror 102' herein affects the shape of the mirror 102', which becomes concave, in the illustrated embodiment. The angle between the lower and upper arms 110' and arm 112' of each hinge 100' has decreased to α', as the arms of the hinges 100' have folded further while moving and deforming downwardly towards the electrode 106'. The lower arm 110' now defines an angle β2 with respect to the substrate 104', which is smaller than the angle $\beta_1$ defined at-rest (FIG. 10*a*). At the limit, the angle $\beta_2$ may reach 0°, wherein the lower arms 110' of both hinges 100' are literally positioned horizontally atop the substrate 104'.

Releasing the potential results again in the mirror 102' returning to its position of FIG. 10*a* due to restoring forces in the hinges 100' and the mirror 102'.

It is noted that in the deformed position of the hinges 100', the mirror 102' performs a combination of displacement and deformation (as in FIG. 10*b*).

The hinges 100' may each have more than the two sections thereof embodied by the lower arm 110' and the upper arm 112' in FIGS. 10*a* and 10*b*.

It is contemplated to provide the light modulator with at least one hinge extending between the substrate and a flexible mirror thereof and capable of being actuated for displacement and deformation.

It is noted that the SLM's S and S' of the present invention can be manufactured using the fabrication methods disclosed in afore-mentioned U.S. Pat. No. 6,025,951.

While this invention has been described with reference to the illustrative embodiments, this description is not intended to be construed to a limiting sense. Various modifications or combinations of the illustrative embodiments, as well as other embodiments of the invention, will be apparent to persons skilled in the art upon reference to the description. It is therefore intended that the described invention encompasses any such modifications or embodiments.

The invention claimed is:

1. A mirror for light modulators, comprising a light-receiving member, at least one hinge adapted to be provided at an upper end thereof with said light-receiving member, said light-receiving member being flexible, said hinge being adapted to extend below said light-receiving member and being displaceable between deformed and extended positon thereby allowing for at least one of the displacement and the deformation of said light-receiving member.

2. A mirror as defined in claim 1, wherein said hinge comprises at least upper and lower sections defining an angle therebetween, said upper section being connected to said light-receiving member, said upper and lower sections being adapted to pivot relative to one another thereby allowing said angle to vary and thus allowing said light-receiving member to at least one of displace and deform.

3. A mirror as defined in claim 2, wherein there are provided two said hinges disposed symmetrically about a plane extending perpendicularly to said light-receiving member when said light-receiving member is in an unbiased position thereof.

4. A mirror as defined in claim 3, wherein for each said hinge, said lower section is adapted to be mounted to a substrate of the light modulator and said upper section is pivotally connected at a lower end thereof to an upper end of said lower section, said upper section being adapted to be connected at an upper end thereof to said light-receiving member.

5. A mirror as defined in claim 4, wherein for each said hinge, said upper section extends at an angle downwardly and outwardly from said light-receiving member, said lower section extending outwardly from said lower end of said upper section, whereby said upper sections of said hinges diverge from one another as they extend downward.

6. A mirror as defined in claim 5, wherein said upper and lower sections define a hinge angle therebetween, said hinge angle being adapted to be greater when said light-receiving member is in a biased position thereof than when said light-receiving member is in said unbiased position.

7. A mirror as defined in claim 1, wherein said light-receiving member is plane when in an unbiased position thereof, said light-receiving member being adapted when biased to adopt a curved attitude.

8. A mirror as defined in claim 7, wherein said curved attitude, when said light-receiving member is biased, is a concave attitude.

9. A mirror as defined in claim 1, wherein said light-receiving member has a curved attitude when in an unbiased position thereof, said curved attitude being adapted to change when said light-receiving member is biased.

10. A mirror as defined in claim 9, wherein said curved attitude, when said light-receiving member is in said unbiased position, is one of a convex a concave attitude.

11. A mirror as defined in claim 1, wherein said hinge and said light-receiving member are electrically conductive so that said light-receiving member can be electrostatically actuated.

12. A light modulator comprising a mirror, a substrate provided with at least one electrode, and at least one hinge extending between said substrate and said mirror, said mirror being flexible with said hinge being displaceable for allowing for at least one of the displacement and the deformation of said mirror.

13. A light modulator as defined in claim 12, wherein said hinge comprises at least upper and lower sections defining an angle therebetween, said upper section being connected to said mirror, said upper and lower sections being adapted to pivot relative to one another thereby allowing said angle to vary and thus allowing said mirror to at least one of displace and deform.

14. A light modulator as defined in claim 13, wherein there are provided two said hinges disposed symmetrically about a plane extending perpendicularly to said mirror when said mirror is in an unbiased position thereof.

15. A light modulator as defined in claim 14, wherein for each said hinge, said lower section is mounted to said substrate and said upper section is pivotally connected at a lower end thereof to an upper end of said lower section, said upper section being connected at an upper end thereof to said mirror.

16. A light modulator as defined in claim 15, wherein for each said hinge, said upper section extends at an angle downwardly and outwardly from said mirror, said lower section extending outwardly from said lower end of said upper section, whereby said upper sections of said hinges diverge from one another as they extend downward, said electrode being positioned under said mirror and between said lower sections of said hinges.

17. A light modulator as defined in claim 16, wherein said upper and lower sections define a hinge angle therebetween, said hinge angle being adapted to be greater when said mirror is in a biased position thereof than when said mirror is in said unbiased position.

18. A light modulator as defined in claim 12, wherein said mirror is plane when in an unbiased position thereof, said mirror being adapted when biased to adopt a curved attitude.

19. A light modulator as defined in claim 18, wherein said curved attitude, when said mirror is biased, is a concave attitude.

20. A light modulator as defined in claim 12, wherein said mirror has a curved attitude when in an unbiased position thereof, said curved attitude being adapted to change when said mirror is biased.

21. A light modulator as defined in claim 20, wherein said curved attitude, when said mirror is in said unbiased position, is one of a convex and a concave attitude.

22. A light modulator as defined in claim 12, wherein said hinge and said mirror are electrically conductive so that said mirror can be electrostatically actuated.

23. A hinge assembly for supporting a flexible mirror in a light modulator, comprising at least one hinge including first and second arms hingedly connected together, an upper end of said hinge being adapted to be connected to the mirror, said first and second arms of said hinge being V-shaped and defining an apex, said hinge being adapted to extend substantially under the mirror with said apex extending inwardly, said hinge being displaceable between deformed and extended positions thereof, thereby allowing for the displacement and deformation of the mirror.

24. A hinge assembly as defined in claim 23, wherein there are provided two said hinges.

25. A hinge assembly as defined in claim 24, wherein said hinges are adapted to be disposed symmetrically under the mirror with said apexes facing each other.

26. A hinge assembly as defined in claim 25, wherein each said first arm comprises an upper arm and each said second arm comprises a lower arm, said upper arm of each said hinge being adapted to be connected to the mirror.

27. A hinge assembly as defined in claim 26, wherein upper and lower arms of each said hinge define an at-rest angle therebetween, said at-rest angle being adapted to decrease when the mirror is biased.

28. A hinge assembly as defined in claim 27, wherein a lower end of each said lower arm is adapted to be pivotally mounted to a substrate of the light modulator, said lower arm and the substrate defining a second at-rest angle, said second at-rest angle being adapted to decrease when the mirror is biased as said lower arm pivots and deforms towards the substrate.

29. A hinge assembly as defined in claim 24, wherein said first and second arms of each said hinge are pivotally connected together at said apex.

30. A hinge assembly as defined in claim 23, wherein said hinge and the mirror are electrically conductive so that the mirror can be electrostatically actuated.

31. A light modulator comprising a flexible mirror, a substrate provided with at least one electrode and at least one hinge connecting said substrate and said mirror, said hinge including first and second arms hingedly connected together, an upper end of said hinge being connected to said mirror, said first and second arms of said hinge being V-shaped and defining an apex, said hinge extending substantially under the mirror with said apex extending inwardly, said hinge being displaceable for allowing for the displacement and deformation of said mirror.

32. A light modulator as defined in claim 31, wherein there are provided two said hinges.

33. A light modulator as defined in claim 32, wherein said hinges are disposed symmetrically under the mirror with said apexes facing each other.

34. A light modulator as defined in claim 33, wherein each said first arm comprises an upper arm and each said second arm comprises a lower arm, said upper arm of each said hinge being connected to the mirror.

35. A light modulator as defined in claim 34, wherein said upper and lower arms of each said hinge define an at-rest angle therebetween, said at-rest angle being adapted to decrease when said mirror is biased.

36. A light modulator as defined in claim 35, wherein a lower end of each said lower arm is pivotally mounted to said substrate, said lower arm and said substrate defining a second at-rest angle, said second at-rest angle being adapted to decrease when said mirror is biased as said lower arm pivots and deforms towards said substrate.

37. A light modulator as defined in claim 32, wherein said first and second arms of each said hinge are pivotally connected together at said apex.

38. A light modulator as defined in claim 31, wherein said hinge and said mirror are electrically conductive so that said mirror can be electrostatically actuated.

* * * * *